Oct. 8, 1957  R. W. FRANKS  2,808,992
DRAFT CONTROL DEVICE
Filed April 5, 1952  3 Sheets-Sheet 1
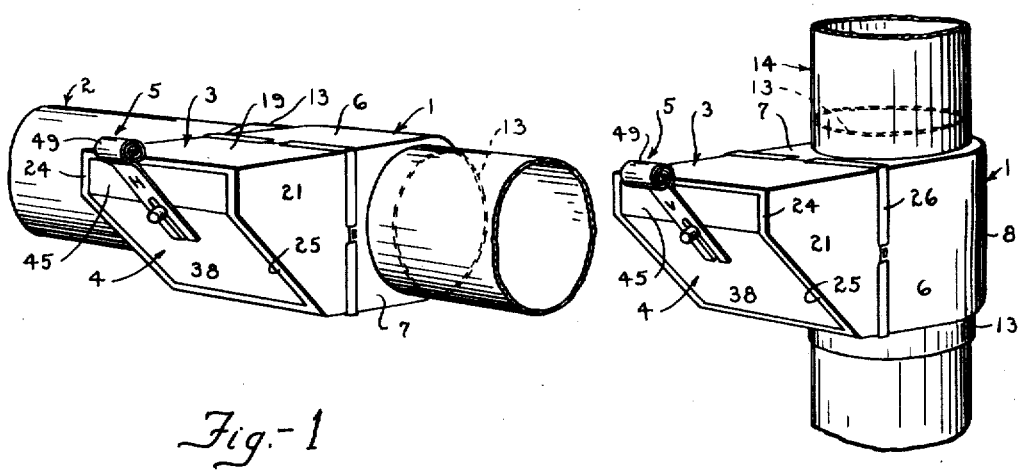
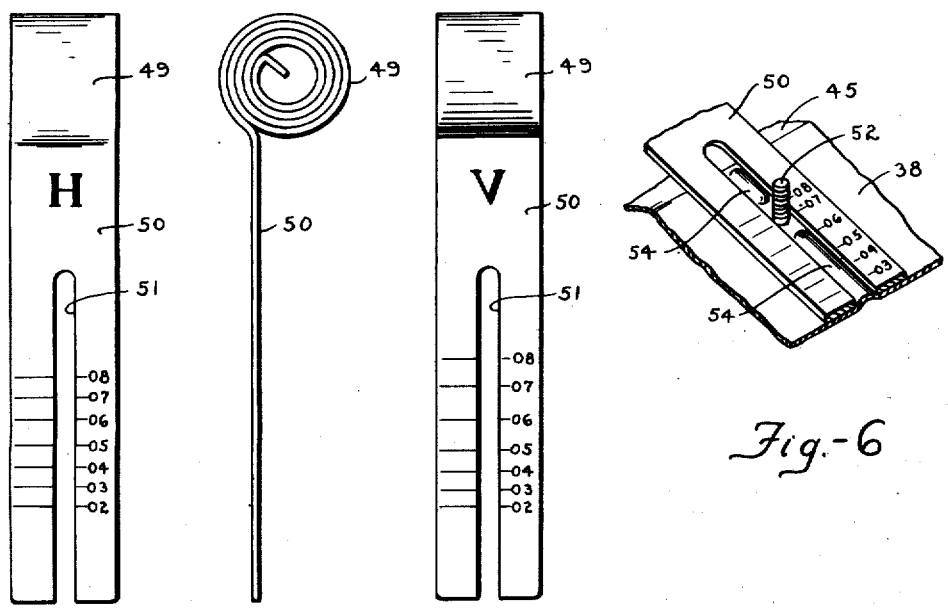
INVENTOR.
ROYE W. FRANKS
BY
Charles S. Penfold
ATTORNEY Oct. 8, 1957 R. W. FRANKS 2,808,992
DRAFT CONTROL DEVICE
Filed April 5, 1952 3 Sheets-Sheet 2
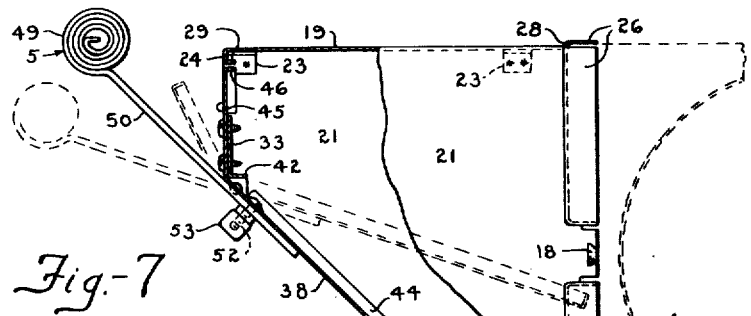
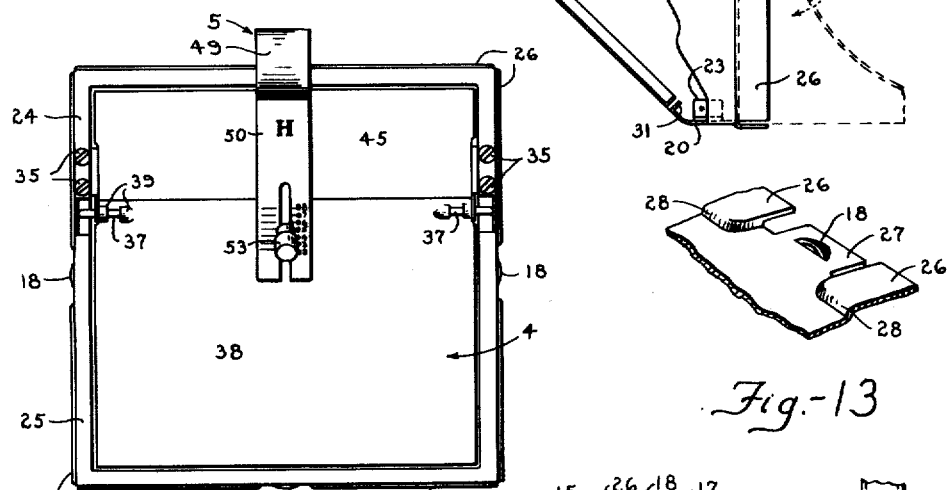
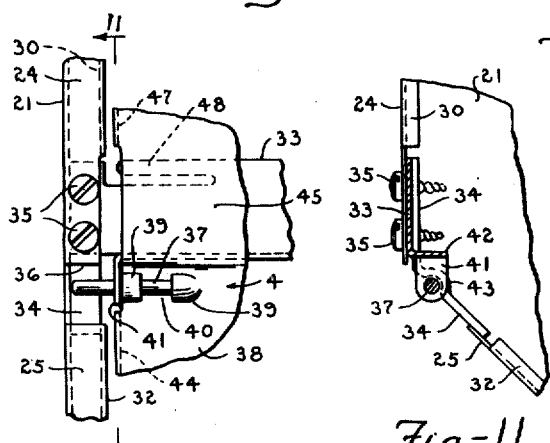
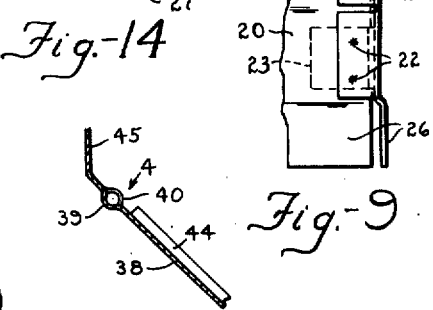
INVENTOR.
ROYE W. FRANKS
BY
Charles S. Penfold
ATTORNEY INVENTOR.
ROYE W. FRANKS
BY
Charles S. Penfold
ATTORNEY United States Patent Office 2,808,992
Patented Oct. 8, 1957

2,808,992

DRAFT CONTROL DEVICE

Roye W. Franks, Long Beach, Mich.

Application April 5, 1952, Serial No. 280,799

15 Claims. (Cl. 236—45)

The invention relates generally to equipment for heating apparatus and more particularly is directed to a draft control device for such apparatus.

The primary object of the invention is to provide a draft control device embodying improved principles of design and construction.

An important object of the invention is to provide a control device which can be easily and quickly installed in any one of an infinite number of practical operative positions in a pipe or flue between a heating unit and a chimney.

A significant object of the invention is to provide a unique control device which includes a housing and a detachable cover or shell therefor, with a vane pivotally mounted on the cover. Otherwise expressed, the housing is comprised of a pair of complementary shell members which can be readily detachably connected together in different operative positions, with the vane movably supported on one of the members.

An object of the invention is to provide novel means for pivotally connecting the vane to the cover or member so that for every practical installation desired, the vane will continue to function as intended.

A particular object of the invention is to provide a control device in which the vane is provided with a novel regulator which comprises a weight and a shaft extending from the weight for supporting the regulator on the vane. The regulator is so constructed that it can be readily reversibly and/or longitudinally adjusted with respect to the cover for different installations of the control device.

A specific object of the invention is to provide a control device in which the regulator is made from a single piece of strip material which is coiled to provide the weight with a flat portion extending from the coil to provide the shaft. The center of the weight or mass is preferably offset with respect to the longitudinal axis of the shaft, so that the regulator can be set to the proper operating position for any given installation requirement. Expressed otherwise, by making the weight or mass off-center, permits the same weight to be used to offset the difference in operational characteristics between vertical and horizontal installations.

Another object of the invention is to provide the shaft of the regulator with suitable indicia which may be utilized in determining what the position of the weight should be for any one of a number of different heating units of known rated outputs or capacities. The construction allows placing on the regulator various weight or draft settings, preferably in numbers, so that an operator has the draft gauge reading without reverting to the use of a separate draft gauge.

Another important object of the invention is to provide a control device with an improved sub-assembly which includes a bridge and the vane, the latter being pivotally connected to the bridge and the bridge in turn being detachably connected to the cover shell and serving to reinforce the shell.

An additional object of the invention is to provide a pair of novel means for fastening the bridge to the cover and wherein a component of each fastening means is located to substantially close what would otherwise be an opening in the cover.

A further object of the invention is to provide the bridge with resilient means for cushioning movement of the vane as it approaches a closed position.

Also, an object of the invention is to provide the cover shell and vane with inturned flanges and the shell with braces for imparting rigidity to the structure.

A further object of the invention is to provide a housing which is constructed for various types of installation, and particularly one in which end walls of different formations can be readily fitted or detachably connected to the housing.

Other objects and advantages of the invention reside in its simplicity of design and construction, durability, efficiency under all operating conditions, and economy in manufacture and assembly.

Additional objects of the invention will become apparent after the description hereinafter set forth is considered in conjunction with the drawings annexed hereto.

Referring to the drawing, wherein a number of modifications of the invention are exemplified:

Figures 1 through 15 exemplify a preferred embodiment or modification of the invention.

Figure 1 is a perspective view showing the control device, embodying the invention, arranged in a horizontal flue or pipe;

Figure 2 is a perspective view depicting the control device disposed in a vertical flue or pipe;

Figure 3 is a face view of the regulator illustrating indicia thereon which can be employed to locate the regulator in a correct position when the control is installed in a horizontal flue;

Figure 4 is a side view of the regulator showing a manner of forming the weight thereon and its offset position;

Figure 5 is a face view of the regulator with indicia thereon for locating the regulator in the correct position when the control device is installed in a vertical flue;

Figure 6 is a partial view showing means for guiding the regulator;

Figure 7 is a side view in elevation of the control device, with portions thereof in section, to illustrate movement of the vane;

Figure 8 is a front view of the control device;

Figure 9 is a partial view of the cover shell showing a mode of joining its end walls with a front wall thereof;

Figure 10 is an enlarged partial view of the control device showing the manner of connecting the vane to the bridge and the novel fastening means for attaching the bridge to the cover shell;

Figure 11 is a section taken substantially on line 11—11 of Figure 10, illustrating additional details of construction;

Figure 12 is a sectional view of a portion of the vane;

Figure 13 is a perspective partial view of one of the components of the snap connection means employed to connect the shell members or sections of the device together;

Figure 14 is a section showing the component of Figure 13 in locking engagement with another or complementary component of the snap connection means carried by the housing;

Figure 19:
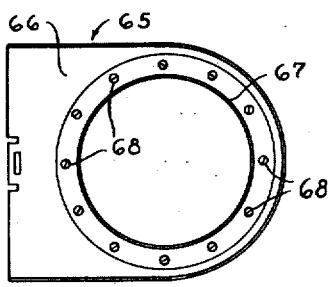
Figure 20:
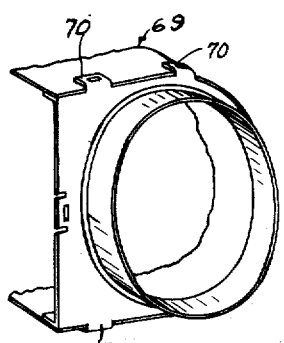

Figure 19 is an end view of a housing showing how a tubular extension can be detachably connected to an end wall of the housing, the arrangement being such that extensions of different diameters can be secured over any sized hole provided in the end wall of the housing; and Figure 20 is a partial perspective view exemplifying how an end wall of a housing can be readily detachably connected to the side walls of the housing.

Considering the drawings more in detail and referring first to Figure 1, the control device includes, among other things, a housing or shell member generally designated 1 which is adapted for direct support on a horizontal flue or pipe 2, a cover or shell member 3 detachably connected to the housing 1, an angular vane 4 pivotally mounted on the cover, and a regulator 5 carried by and adjustable on the vane.

Figure 15:
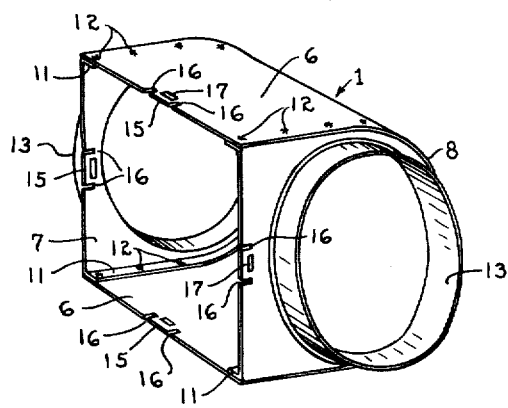
Figure 15 is a perspective view of the housing or shell section of the control device that is adapted for direct support on a flue; said view showing how the separate end walls are connected to the side walls and cylindrical wall of the housing.

The housing 1 may be designed and constructed in various ways but as exemplified in Figures 1, 2 and 15, preferably includes a pair of corresponding planar parallel side walls 6 and a pair of separate corresponding planar parallel end walls 7. The side walls 6 are joined by a substantially semi-cylindrical wall 8 and the end walls 7 are provided with portions which merge or conform to the curvature of the cylindrical wall 8. Each of the end walls is provided with an arcuate flange conforming to the cylindrical wall 8 and a pair of inturned parallel flanges 11. These flanges are preferably spot-welded to the side walls and cylindrical wall as indicated at 12.

Each of the end walls 7 is provided with an opening within which a tubular extension 13 is suitably secured as shown in Figure 15. These extensions are aligned and adapted for overlapping connection with sections of the flue 2 as shown in Figure 1. It will be noted that the housing and extensions are of such a size and shape that there is practically no interference in the free flow of gases through a flue in which the device is installed. With this setup the housing 1 can be easily and quickly installed either in a horizontal position in the horizontal flue 2 as shown on Figure 1, or in a vertical position in a vertical flue 14 as depicted in Figure 2, or in any desirable inclined position between the horizontal and vertical positions. The extensions 13 are connectible to conventional or standard flue pipes, thereby promoting adaptability of the housing to different installations.

The side and end walls of the housing 1 preferably form a square, with the free marginal edges of the walls arranged in the same plane. Each of these walls, substantially midway its marginal edge, is provided with a yieldable or resilient portion 15, constituting a component of a means for detachably locking the cover and housing together. The portions 15 are identical, and each is preferably formed by cutting parallel notches 16 in the walls as shown in Figure 15. Each of the portions 15 is provided with a small slot 17. As will be pointed out subsequently, and as clearly depicted in Figure 14, these slots are adapted to receive lip-like projections 18 carried by the walls of cover shell 3.

The cover shell 3 may be formed in various ways but as herein illustrated embodies improved principles of design and construction. This cover, among other things, includes a top wall 19, a bottom wall 20, and corresponding parallel end walls 21 of trapezoidal shape. The top wall is relatively large and substantially square in shape whereas the bottom wall is rectangular and relatively narrow in width. More particularly, the top and end walls are constructed from a single piece of sheet stock, with the free ends of the lower free extremities of the end walls being preferably joined to the ends of the bottom wall 18 by spot welds 22 as exemplified in Figure 9. Corner braces 23 are also preferably welded to the end walls and bottom wall and to the top wall and end walls as shown in Figures 7 and 9. In lieu of braces, the corner portions of the cover may be reinforced by forming corrugations thereon. The cover shell also includes what may be termed a vertical front wall 24 and an inclined front wall 25 having opposed portions which define an opening within which the angular vane 4 pivots for simplicity in assembly. The top, bottom and end walls of the cover shell 3 form a square which is substantially the same size as the square formed by the walls of the housing 1. It is to be understood that any formation suitable for the purpose may be provided in each of the shells so as to secure a predetermined selective relationship therebetween. The free marginal edge of each of the walls just referred to, is, however, preferably provided with a pair of longitudinal offsets 26, clearly shown in Figure 13, for slidably embracing the marginal edge portions of the walls of the housing 1 as illustrated in Figures 1, 2, 7 and 14. Midway between the longitudinal offsets 26 on each of the walls just referred to, there is provided a yieldable or resilient portion 27 constituting a component of the means for detachably locking the housing and cover shells together. It is to be understood that the use of such terms as "end walls," "side walls," "top wall" and "bottom wall" are merely relative expressions and are not to be construed as limiting the scope of the invention.

One important feature of the invention resides in providing an arrangement whereby the shells can be easily and quickly connected together in any one of a plurality of positions. This is accomplished by providing each of the shells with a square formation as described above so that a portion of one shell will in some measure fit within a portion of the other. Figure 1 illustrates the cover shell secured in one position to the housing 1 and Figure 2 illustrates another position of securement. This novel arrangement is an important factor as it facilitates installation of the cover shell.

It will be noted that longitudinal shoulders 28 are formed by the offsets 26 to provide stops limiting inward telescoping movement of the shells, that the yieldable portions 15 and 27 provided on the walls of the shells are respectively disposed in the planes of such walls, and that when the shells are assembled, the yieldable locking portions will overlap one another so that the lip-like projections 18 will fit in the slots 17. The projections are preferably curved as shown so that the portions 15 and/or portions 27 will be gradually cammed apart until the edges of the housing walls more or less engage the shoulders 28 on the cover shell, whereupon the projections will snap into the slots to produce four individual positive locks. The projections or slots may be termed abutment means, and insofar as this locking feature is concerned, one or both of the locking portions referred to may be resilient or yieldable. The cover shell 3 can be removed from the housing 1 by merely pressing inwardly on the projections to release the projections from the slots. Obviously, other forms or types or locking means may be employed but the one exemplified has proven very satisfactory and efficient in use.

As stated above, opposed portions of the vertical front wall 24 and inclined front wall 25 of the cover shell define an opening within which the angular vane 4 is located. Each of these walls more or less forms a sort of generally U-shaped frame for the vane. The wall 24 is provided with an upper inturned flange 29 disposed in spaced apart parallel relation to the top wall 19, as shown in Figure 7, and is further provided with inturned vertical flanges 30 on opposed portions of the wall. One of these flanges is shown in Figures 10 and 11. The inclined wall 25 is provided with a lower inturned flange 31 and inclined inturned flanges 32 paralleling the end walls 21. These flanges impart rigidity to the walls on which they are formed.

An elongated bridge 33 has its ends detachably secured to the rear sides of the opposed portions of the vertical wall 24 by fittings 34 and fast threading screws 35 which extend through the wall and bridge and connect with the fittings as shown in Figures 10 and 11. This bridge, among other things, serves to brace the end walls 21 of the cover shell and provide a support for the vane. It will be noted by referring to Figures 10 and 11 that the inturned vertical flanges 30 on the wall 24 are shortened to provide clearances for the ends of the bridge 33 and that the opposed portions of the inclined wall 25 are provided with clearance openings or gaps 36 for elongated cylindrical pivots 37 carried by the lower inclined planar section 38 of the vane. The inner extremity of each pivot is preferably anchored to the vane by inserting such extremity between a pair of spaced curved portions 39 struck outwardly from one side of the vane and an intermediate curved portion 40 struck outwardly from the other side of the vane, and then pressing the portions upon such extremity. Each pivot is supported or hung in an offset bearing 41 formed by bending outwardly a portion of an inturned longitudinal reinforcing flange 42 provided on the bridge 33.

Attention is directed to the fact that the fittings 34 are of a length to bear against the rear sides of the opposed portions of walls 24 and 25 and close the gaps 36 to prevent circulation of air therethrough. The fittings are preferably bent as indicated at 43 in Figure 11 to afford clearance for rotational movement of the outer free extremities of the pivots. The arrangement is such that the vane is stabilized for movement in a single plane and such movement is relatively free due to the reduction of friction at the pivotal connections.

The lower planar section 38 of the vane is provided with inturned flanges 44 which parallel the flanges 32 on the inclined wall 25. The flanges 44 impart rigidity to the vane. The vane also includes an upper planar section 45 having a top inturned flange 46 and a pair of relatively short inturned flanges 47 which respectively parallel the flanges 30 on the wall 24. It is important to note that although the length of the lower section of the vane is sufficient to extend a short distance into the housing 1 it will never project into or intercept the free flow of gases through the flue or housing. It will also be noted that the points of pivotal connection between the vane and cover shell are so disposed that the outer planar surfaces of the upper and lower vane sections will be respectively substantially flush with walls 24 and 25 when the vane is in a closed position as depicted in Figure 7.

The bridge 27, as shown in Figure 10, is provided with a yieldable longitudinally extending finger 48 at each extremity thereof. These fingers project outwardly so that their free ends afford resilient abutments to cushion the vane as it reaches its closed position and thereby prevents vibration and banging of the vane against the bridge. With this arrangement, closing of the vane is rendered noiseless.

As stated above, a very important feature of the invention resides in providing a novel regulator which can be readily adjusted to compensate for differences in vertical and horizontal installations and in various angular installations. The regulator generally designated 5 is unique in character and as clearly shown in Figures 3, 4 and 7, is preferably comprised of a single strip of metal which is formed to provide a coil constituting a weight 49 which is offset with respect to a shaft or flat shank portion 50 having a longitudinal slot 51 therein. As shown in Figure 3, one side of the shank is provided with indicia including a letter H to indicate the location the regulator should take when the complete control device is installed in a horizontal or near horizontal flue 2, as shown in Figure 1. The other side of the shank is provided with a letter V to indicate that the position of the regulator shall be in accordance with Figure 2. When the control device is installed in a horizontal flue as in Figures 1 and 7, or at an angle less than 45°, the regulator is attached to the vane with the weight 49 disposed toward the control. When the control is installed in a vertical flue as in Figure 2, or at an angle between 45° and the vertical, the regulator is attached so that the weight is located away from the control.

The means employed for securing the regulator in either of the positions just referred to or in any position of longitudinal adjustment, includes a threaded stud 52 and a nut 53. The inner end of the stud is anchored to the cover by any suitable means and its outer end extends through the slot 51 in the shank. Longitudinal movement of the regulator is preferably accomplished by a pair of aligned ribs 54 formed in the vane on either side of the stud and which project into the slot as shown in Figure 6.

As shown in Figures 3 and 5, the sides of the shank of the regulator are also provided with calibrations or line graduations identified by numerals 02 through 08 which are adapted for selective registry with the axis of the stud 52. The calibrations 02 through 06 in Figure 3 are each spaced farther from the lower end of the shank than the calibrations 02 through 06 in Figure 5 and the calibrations 07 and 08 in Figure 3 are each spaced closer to the end of the shank than the calibrations 07 and 08 in Figure 5. Also the distances between the calibrations 02, 03 and 04 are greater than the distances between the corresponding numbered calibrations in Figure 5; the distance between the calibrations 04 and 05 in Figures 3 and 5 are identical; and the respective distances between the calibrations 05, 06, 07 and 08 in Figure 3 are less than the respective distances between the corresponding numbered calibrations in Figure 5. These calibrations on the opposite sides of the regulator have been predetermined so that a person installing the control can adjust the control to the draft required by any furnace or stove without the use of a separate draft gauge. It is to be understood, that if found desirable, the calibrations may be placed on the vane in lieu of on the regulator.

The regulator is calibrated for all required water column inches and when the draft for a manufacturer's furnace is given, it is a simple matter to adjust the regulator in accordance with any known draft requirement and then lock it in place. If, for example, the draft requirement indicates that the regulator should be set with the 02 calibration intersecting the axis of the stud for installation of the control in a horizontal flue, the setting of the 02 for installation of the control in a vertical flue will result in substantially the same operation of the vane. In other words, by merely reversing and adjusting the position of the regulator the vane can be made to function the same for any practical installation of the control device.

Attention is directed to the fact that utilizing an angular vane produces a more effective area exposed to the pressure differential which is the motivating influence on the vane. Since the angled areas are exposed to this pressure differential, the vane will respond more quickly to smaller draft fluctuations. Also, by mounting the vane at an angle the rotative angle is decreased. If the vane hangs substantially vertically, it must rotate through 90 degrees to open fully. It is relatively simple to balance the vane correctly through this smaller arc or range of movement. Furthermore, since there is very little friction at the pivots, the vane is made sensitive to any slight change in the pressure differential.

In view of the foregoing, it will be manifest that the control device embodies improved principles of design and construction which in use have proven of great value in maintaining proper combustion of fuel.

Figure 16:
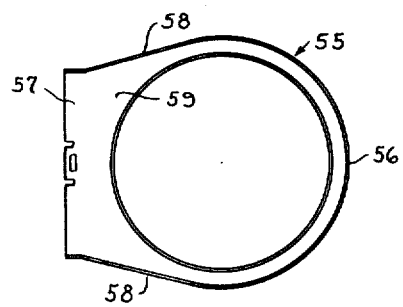
Figure 16 is an end view of a different form of housing that may be substituted for the housing depicted in Figure 15; in this form the side walls of the housing are arranged in a converging relationship.

As indicated above, housings of forms different from the housing 1 may be utilized. In Figure 16, for example, there is shown a generally cylindrical housing 55, the diameter of its cylindrical wall 56 being somwhat greater than the distance between the opposed walls of a square formation 57. More specifically, this housing includes a pair of converging side walls 58 joined by the cylindrical wall 56 and a pair of end walls 59 which conform to the side walls and cylindrical wall.

Figure 17:
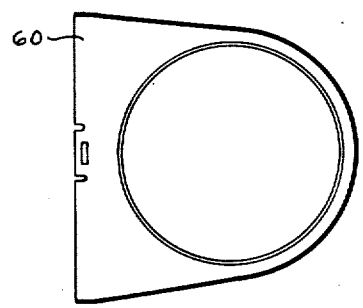
Figure 17 is an end view, similar to Figure 16, showing another form of housing that may be utilized; in this form the side walls of the housing are arranged in a diverging relationship.

The housing illustrated in Figure 17 is similar to the generally cylindrical housing of Figure 16, except that the diameter of its cylindrical wall is somewhat less than the distance between the opposed walls of its square formation 60.

Figure 18:
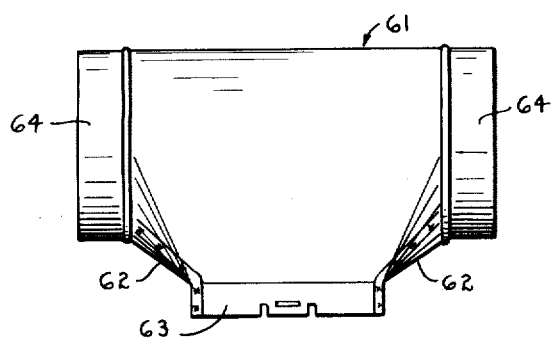
Figure 18 is a side view in elevation of a different form of housing which is provided with continuations which support tubular extensions for connection with a flue.

As illustrated in Figure 18, a generally cylindrical housing 61 is provided with continuations 62 extending outwardly beyond a square formation 63. Each continuation is provided with tubular cylindrical extension 64 having a diameter substantially corresponding to the diameter of the cylindrical wall of the housing.

Figure 19 exemplifies a housing 65 similar to the housing 1, except that its end walls 66 are provided with tubular extensions 67 which are detachably connected to the walls by screws 68. With this arrangement, tubular extensions of different sizes may be connected to the end walls of the housing so that the control device may be readily installed in flues or pipes of different diameters.

In Figure 20 of the drawing there is illustrated a housing 69 similar to housing 1, and provision is made whereby the end walls of the housing may be detachably connected to the side walls and cylindrical wall of the housing by snap connection means 70 corresponding to the ones used in connecting the cover shell 3 and housing 1 together. With this setup, end walls carrying tubular extensions of different diameters can be advantageously used to facilitate adapting the control to conventional flues of different diameters in a manner similar to the arrangement of Figure 19.

Having thus described my invention it is to be understood that various modifications of the invention may be utilized without departing from the spirit of the invention, hence I do not wish to be limited to the exact forms, constructions or arrangements herein illustrated and described, except as defined by the appended claims.

I claim:

1. A sub-assembly for a draft control device comprising a vane member provided with a threaded part, a nut carried by the threaded part, a regulator having a shank provided with a slot slidably receiving the part, a weight carried by and offset from one end of the shank, and said shank having calibrations on one side spaced predetermined distances from one location on the shank and calibrations on the other side being spaced different distances from said location.

2. A vane member for a draft control device, a regulator member, means slidably connecting the regulator to the vane, said regulator having a flat shank and a weight carried by and offset from one end thereof, said connecting means and said shank being so constructed and arranged that the regulator can be manually shifted and secured in either one of two reversible positions on the vane, and calibrations provided on one of the members for determining slidable operative positions of the regulator member relative to the vane member.

3. A sub-assembly for a draft control device comprising an elongated straight bridge member provided with depending offsets adjacent its extremities, a vane member pivotally mounted on the offsets, and means adjacent the offsets for cushioning movement of the vane member when it is swung in one direction against the means.

4. A housing provided with tubular extensions adapted to be supported on a flue, a square formation provided on the housing, a cover shell having a square formation connected to the square formation on the housing, an opening provided in the shell, an elongated bar-like bridge extending across the opening at a level below the upper marginal edge of the opening, a vane pivotally mounted on the bridge for movement relative to the opening, means located adjacent the extremities of the bridge for cushioning the vane as it swings to close the opening, and a regulator carried by the vane for the purpose specified.

5. A regulator for use in a draft control device, said regulator being constructed from a single piece of strip stock to provide a shank portion and a coiled portion offset from the shank portion to form a weight, and calibrations provided on the shank portion for determining its operative positions with respect to a control device.

6. A sub-assembly for a draft control device comprising a vane, a regulator having a shank provided with a slot, means extending through the slot for slidably connecting the regulator for adjustment on the vane, a weight carried by and offset from one end of the shank, and said shank having calibrations on one side for use when the weight faces the vane and calibrations on its other side for use when the position of the regulator is reversed to dispose the weight away from the vane.

7. A draft control device comprising a housing and a box-like cover member, said housing being provided with means for supporting the device on a flue and said cover constituting a continuation of the housing and being provided with an opening, abutment means on one member and yieldable means on the other member cooperating with the abutment means providing a snap detachable connection between the members, a bar-like bridge element disposed across the opening between its upper and lower margins, a vane element mounted on the bridge for pivotal movement relative to the opening, means on one of said elements for cushioning movement of the vane when it approaches a position to close the opening, and a regulator having a shank portion adjustably connected to the vane and a weight carried by one end of the shank.

8. A draft control device comprising a shell having a top wall, side walls, a vertical front wall and an inclined front wall, a bridge, means connecting the bridge with opposed portions of the vertical front wall and a member joining opposed portions of the inclined front wall, said opposed portions of the inclined front wall having openings therein, bearings carried by the bridge, a vane, pivots on the vane mounted in the bearings, and said connecting means including components closing said openings.

9. A draft control device comprising a shell having an open rear end, a top wall, a bottom wall of a size smaller than the top wall, a pair of side walls, an upper vertical front wall provided with an opening, a lower inclined wall provided with an opening of a size larger than the opening in the front wall and communicating with the latter opening, and a vane pivoted on a horizontal axis and having a vertical planar portion and an inclined planar portion which portions are respectively disposed for movement in the openings in the front and inclined walls.

10. A draft control device comprising a shell having an open rear end, a top wall, a bottom wall of a size smaller than the top wall, a pair of side walls, an upper vertical front wall provided with an opening, a lower inclined wall provided with an opening communicating with the opening in the front wall, and a vane pivoted on a horizontal axis located adjacent the junction between the vertical and inclined walls and having a vertical planar portion and an inclined planar portion which portions are respectively disposed for movement in the openings in the front and inclined walls.

11. A draft control device comprising a shell having an open rear end, a top wall, a bottom wall of a size smaller than the top wall, a pair of side walls, an upper vertical front wall provided with an opening, a lower inclined wall provided with an opening of a size larger than the opening in the front wall, an elongated bridge having its ends supported adjacent the junction between the vertical and inclined walls of the housing, and a vane pivoted on the bridge and having a vertical planar portion and an inclined planar portion which portions are respectively disposed for movement with respect to the appropriate openings.

12. The structure defined in claim 9, in which the top and side walls of the shell are provided with offset marginal edge flanges and components of snap-connection means for detachably holding the shell with respect to a mounting.

13. The structure defined in claim 9, in which the top and bottom walls are respectively provided with means for attaching the shell to a mounting, at least one of said means constituting a component of a snap connection.

14. In a draft control device comprising an open ended shell for passage of fluid therethrough from the open end thereof into a flue or the like, a unitary vane adapted to be opened by excess pressure on the outer side thereof, means on said shell and on said vane for pivotally mounting the vane for movement about an axis transverse to the longitudinal axis of the shell, said vane having different portions on opposite sides of said axis and disposed at an obtuse angle relative to each other about said axis for increasing the effective area of the vane to motivating pressure, the relationship of said portions to the shell being such that when the vane is disposed in one position the outer peripheries of said portions are disposed adjacent said shell to close and prevent flow of a fluid through the shell, and when moved about said axis from the closed position toward open position the said peripheries move progressively toward the center of said shell whereby restriction of fluid flow past each of said portions progressively diminishes as said vane is pivotally moved from closed position toward full open position.

15. A draft control device as defined in claim 14, wherein the portions of said shell adjacent said peripheries, when said vane is in closed position, constitute end margins of said shell.

References Cited in the file of this patent

UNITED STATES PATENTS

| Number | Name | Date |
|---|---|---|
| 245,560 | Puffer | Aug. 9, 1881 |
| 1,905,734 | Morrow | Apr. 25, 1933 |
| 1,980,818 | Morrow | Nov. 13, 1934 |
| 2,009,568 | Walker | July 30, 1935 |
| 2,182,625 | Field | Dec. 5, 1939 |
| 2,268,348 | Stephenson | Dec. 30, 1941 |
| 2,433,749 | Field | Dec. 30, 1947 |
| 2,506,497 | Franks | May 2, 1950 |
| 2,522,786 | Hubbart | Sept. 19, 1950 |
| 2,539,815 | Dady | Jan. 30, 1951 |
| 2,605,968 | Stephenson | Aug. 5, 1952 |

UNITED STATES PATENT OFFICE

CERTIFICATE OF CORRECTION

Patent No. 2,808,992                                            October 8, 1957

Roye W. Franks

It is hereby certified that error appears in the above numbered patent requiring correction and that the said Letters Patent should read as corrected below.

In the grant, line 3, address of inventor, for "Long Beach, Michigan" read -- Long Beach, Michigan City, Indiana --; in the heading to the printed specification, line 3, for "Long Beach, Mich." read -- Long Beach, Michigan City, Ind.

Signed and sealed this 24th day of December 1957.

(SEAL)

Attest:

ARL H. AXLINE

Attesting Officer

ROBERT C. WATSON
Commissioner of Patents